S. N. HURT.
INDICATOR HAND.
APPLICATION FILED JUNE 3, 1921.
1,409,299.
Patented Mar. 14, 1922.
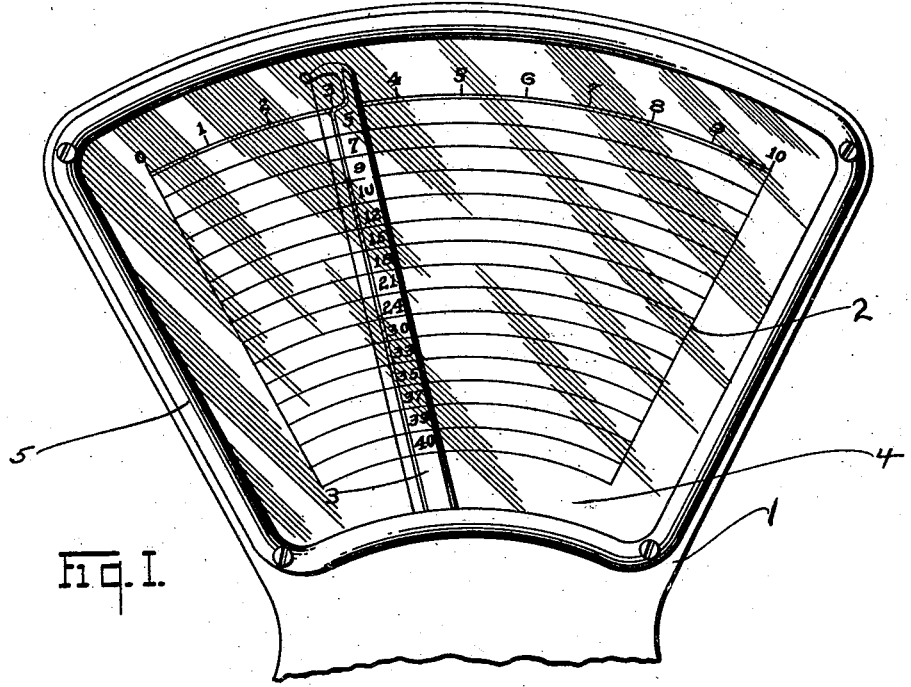
Fig. I.
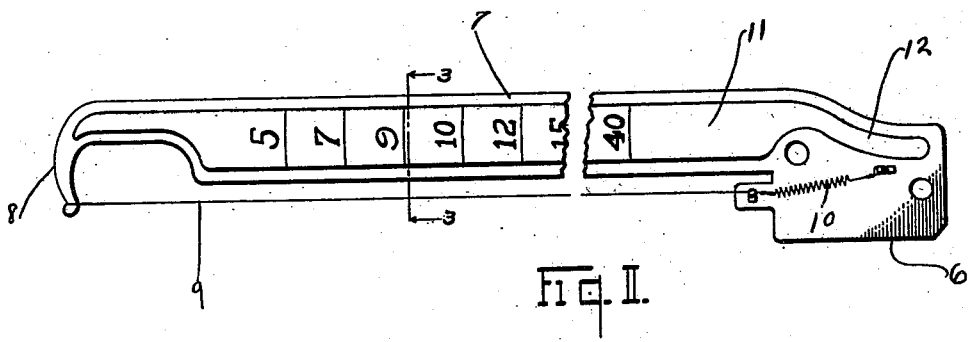
Fig. II.
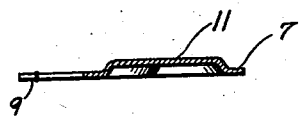
Fig. III.
Inventor
SAMUEL N. HURT.
By C O Marshall
Attorney

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

INDICATOR HAND.

1,409,299.  Specification of Letters Patent.  Patented Mar. 14, 1922.

Application filed June 3, 1921. Serial No. 474,632.

*To all whom it may concern:*

Be it known that I, SAMUEL N. HURT, a citizen of the United States, residing at Toledo, in the county of Lucas and State of Ohio, have invented certain new and useful Improvements in Indicator Hands, of which the following is a specification.

This invention relates to indicating devices, and particularly to hands adapted to co-operate with computing charts and bearing a series of characters adapted to be brought into juxtaposition with computations indicated by the hand.

The indicator hand of my invention is particularly adapted for use in weighing scales and I have shown it as co-operating with the fan-shaped computing chart of a scale, but it is to be understood that it is also adapted for use in other indicating devices. It is important that the indicator of a weighing scale or other delicate measuring instrument be as light as it is possible to make it without the sacrifice of strength and rigidity, and one of the principal objects of my invention is the provision of a hand which is especially strong and rigid for its weight.

Another object of my invention is the provision of a strong rigid hand of light weight having a flat surface unbroken by strengthening ribs and adapted to be marked with printed characters.

Another object is the provision of a strong light indicator hand of pleasing appearance.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is an elevation showing the fan-shaped chart housing of a well known type of automatic computing scale and illustrating the co-operation of the indicator hand of my invention with a computing chart;

Figure 2 is an enlarged detail view of my indicator hand, a part of the hand being broken out;

Figure 3 is a section taken substantially on the line 3—3 of Figure 2.

The housing 1 within which the computing chart 2 and indicator hand 3 are contained is provided with a transparent face 4 held in place by a scroll 5. The chart 2 is provided with a plurality of rows of computations (not shown), each row co-operating with a portion of the indicator hand upon which is printed a price character which is a factor of each of the computations in the particular row over which that portion of the hand swings during a weighing operation. In order that the price characters may be printed upon the indicator hand with the minimum of trouble and expense, it is desirable that the portion of the hand upon which the characters are printed be absolutely flat. If, however, a flat piece of metal without strengthening ribs be employed for the hand, the hand must necessarily be made very heavy in order that it may have sufficient strength and rigidity. It has, therefore, been customary to strengthen indicator hands of this kind by a longitudinally extending rib, and, since such a rib breaks the flat printing surface, it has usually been necessary to mark the price characters upon the hand by a manual operation.

The hand of my invention is stamped from sheet metal and, as shown in Figure 2, the widest portion 6 of the hand is at its lower end, which is fixed to the pendulum or other rotatable member by which the hand is carried. From the wide portion 6 the portion 7 of the hand bearing the price characters extends upwardly and terminates in a hook 8, to which one end of the index wire 9 is attached, the other end being attached to the enlarged portion 6, and the wire being held taut by means of a coil spring 10. The hand is strengthened by means of a boss 11 having a flat printing face only slightly smaller in area than the portion 7 of the hand, the boss being extended, as at 12, into the wide portion 6 of the hand in order that no weak line may occur at the juncture of the portions 6 and 7. It will be seen that this boss provides the necessary strength without breaking the flat face of the hand and that it also imparts to the hand a pleasing appearance.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. An indicator hand consisting of an elongated sheet metal member having a flat faced boss extending substantially throughout its length.

2. An indicator hand consisting of a sheet metal member widened at one end and having an elongated portion extending therefrom, and a flat faced boss extending throughout the length of said elongated portion and having an extension running into said widened portion.

3. An indicator hand consisting of a sheet metal member having a widened portion at one end, an elongated portion extending from said widened portion and terminating in a hook, and a flat faced boss extending throughout the length of said elongated portion and having an extension running into said widened portion.

4. An indicator hand consisting of a sheet metal member having a widened portion at one end, an elongated portion extending from said widened portion and terminating in a hook, a flat faced boss extending throughout the length of said elongated portion and having an extension running into said widened portion, and an index wire extending from said hook to said widened portion and lying substantially parallel to said elongated portion.

SAMUEL N. HURT.

Witnesses:
FRANCES DOYLE,
HARRY ERNSBERGER.